US008832179B2

(12) United States Patent
Owen et al.

(10) Patent No.: US 8,832,179 B2
(45) Date of Patent: Sep. 9, 2014

(54) METHOD, SYSTEM, AND COMPUTER PROGRAM PRODUCT FOR A RELAY SERVER

(75) Inventors: Joe Owen, Suwanee, GA (US); Senthil Krishnapillai, Eagle, ID (US); Eric Nelson, Boise, ID (US); Bryan Whitmarsh, Meridian, ID (US)

(73) Assignee: iAnywhere Solutions, Inc., Dublin, CA (US)

( * ) Notice: Subject to any disclaimer, the term of this patent is extended or adjusted under 35 U.S.C. 154(b) by 1928 days.

(21) Appl. No.: 11/498,830

(22) Filed: Aug. 4, 2006

(65) Prior Publication Data

US 2007/0294407 A1      Dec. 20, 2007

Related U.S. Application Data

(60) Provisional application No. 60/814,872, filed on Jun. 20, 2006.

(51) Int. Cl.
*G06F 15/16* (2006.01)
*H04L 29/06* (2006.01)

(52) U.S. Cl.
CPC .......... *H04L 63/029* (2013.01); *H04L 63/0281* (2013.01)

USPC ............................ 709/203; 709/228; 709/229

(58) Field of Classification Search
USPC ....................................................... 709/203
See application file for complete search history.

(56) References Cited

U.S. PATENT DOCUMENTS

| 6,339,830 B1* | 1/2002 | See et al. ..................... 726/15 |
| 2002/0023143 A1* | 2/2002 | Stephenson et al. .......... 709/218 |
| 2002/0124090 A1* | 9/2002 | Poier et al. ..................... 709/228 |
| 2004/0162871 A1* | 8/2004 | Pabla et al. .................... 709/201 |

OTHER PUBLICATIONS

Cerami, Ethan. *Delivering Push*. New York: McGraw-Hill, 1998.

* cited by examiner

*Primary Examiner* — Emmanuel L Moise
*Assistant Examiner* — Mahran Abu Roumi
(74) *Attorney, Agent, or Firm* — Sterne, Kessler, Goldstein & Fox P.L.L.C.

(57) ABSTRACT

A relay server is located outside a firewall and provides access to a server inside the firewall. Both the server and a client (the client is outside the firewall) initiate a connection with the relay server. The relay server then sets up a connection between the server and client, to thereby enable the server and client to communicate. Such communication is enabled without needing an inbound port in the firewall, thereby enhancing security.

34 Claims, 7 Drawing Sheets

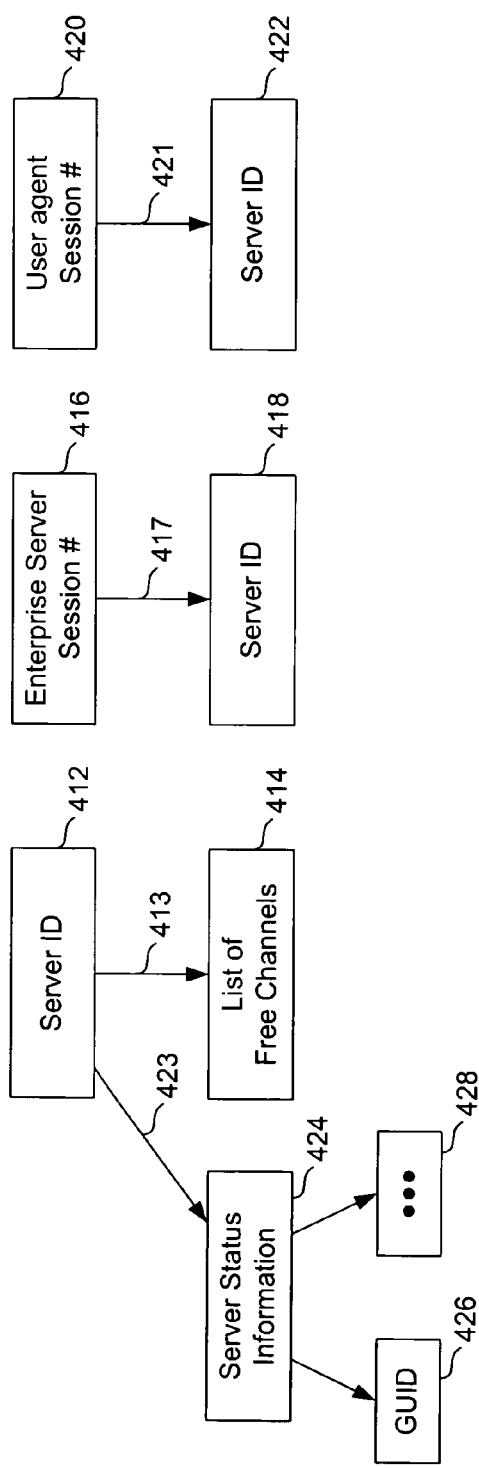
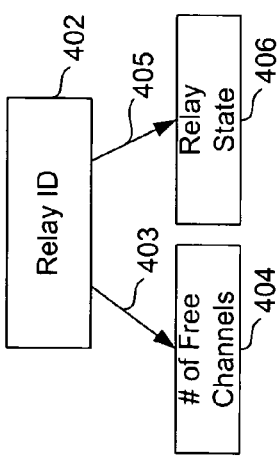
FIG. 4a
FIG. 4b

METHOD, SYSTEM, AND COMPUTER PROGRAM PRODUCT FOR A RELAY SERVER

CROSS-REFERENCE TO RELATED APPLICATIONS

The present application claims the benefit of U.S. Provisional Patent Application No. 60/814,872 filed on Jun. 20, 2006, which is incorporated herein by reference in its entirety.

BACKGROUND OF THE INVENTION

1. Field of the Invention

The present invention generally relates to networking. In particular, the present invention relates to techniques for establishing communications with a secured enterprise network from a remote user agent.

2. Background Art

High-end mobile communication devices provide a number of services aside from simple voice telephony. One popular area of use for such devices, particularly in business applications, is as mobile user agents for e-mail communications, as well as other popular applications in device management, security, or custom applications.

In order to access corporate services such as, by way of example, e-mail, it is necessary to have an enterprise sever in addition to a traditional mail server that manages the communications between the mail server and a user agent, such as a cellular phone device. The enterprise server constantly monitors the mail server in a manner similar to other user e-mail clients within the same corporate network. When mail is received by the mail server, it is retrieved by the enterprise server and stored locally for subsequent transmission to the user agent. The mail is then transmitted to the user agent over the Internet and, in the case of wireless user agents such as cellular phones, over a wireless network.

The previous enterprise server software design suffers from the need to initiate communications from the user agent to the enterprise server. Turning to FIG. 1, enterprise servers such as enterprise server 100 are generally located behind a protective firewall 102 configured to block many incoming communications. In order to initiate communications with an enterprise server 100 located behind such a firewall 102, it is necessary to open a port for inbound communications at the firewall. Unfortunately, by opening a firewall port to accept desired inbound communications, the corporate network is opened up to undesired inbound communications, soliciting hacking attempts upon the enterprise server 100 itself and the rest of the corporate network.

One solution in the prior art is to provide a staging server in the demilitarized zone (DMZ), the area of the network outside of the firewall 102. The enterprise server 100 is still required to access the mail server (or other service) within the corporate network, and the staging server must be able to establish a connection to the enterprise server 100, so firewall ports must be opened for inbound connections. While certain security measures can be taken to ensure that only the staging server is able to communicate through those ports, the enterprise server 100 now becomes very vulnerable to attacks, as may the rest of the enterprise network. The staging server is also very vulnerable to attacks as it is located entirely within the DMZ. This is especially critical because the prior art solution requires that the staging server retrieve and store a copy of mail messages from the enterprise server 100 for subsequent transmission to a user agent 108 over the Internet 104 and a wireless communication network 106, since the user agent 108 does not have a persistent connection to the wireless communication network 106.

Accordingly, what is desired is a method, system, and computer program product for the access of corporate enterprise services without the need to breach the corporate firewall. Furthermore, it is desired that the proposed method, system, and computer program product not retain sensitive mail messages and/or other data objects on any system located within the DMZ for security reasons. Finally, it is desired that the proposed method, system, and computer program product function as seamlessly as possible with existing networking platforms.

BRIEF SUMMARY OF THE INVENTION

The invention includes a method of initiating communication between a user agent and an enterprise server through a firewall. The firewall is configured to allow the enterprise server to initiate a first connection to a relay server. A second connection is initiated from the user agent to the relay server. The two connections are then associated with each other, and subsequent data is relayed between the user agent and the enterprise server.

The invention also includes a system for implementing secure communications between a user agent and an enterprise server through a firewall. The system includes a client such as the user agent, a server such as the enterprise server, and a relay server. The relay server is connected to the client by a connection established by the client, and to the server through the firewall by a connection established by the server. The relay server is configured to relay data from the connection between itself and the server to the connection between itself and the client, as well as from the connection between itself and the client to the connection between itself and the server.

The invention further includes a computer program product having control logic (software) that comprises first and second receiving means. The first receiving means enables a processor to receive a communication request from a server, and the second receiving means enables a processor to receive a communication request from a client. The control logic further comprises an association means that enables a processor to associate the communication request from the server to the communication request from the client, and a first and second relaying means. The first relaying means enables a processor to relay communications from the client to the server, and the second relaying means enables a processor to relay communications from the server to the client.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 4A and 4B illustrate data mappings maintained by a relay server and an enterprise server in accordance with an embodiment of the present invention.

Figure 1:
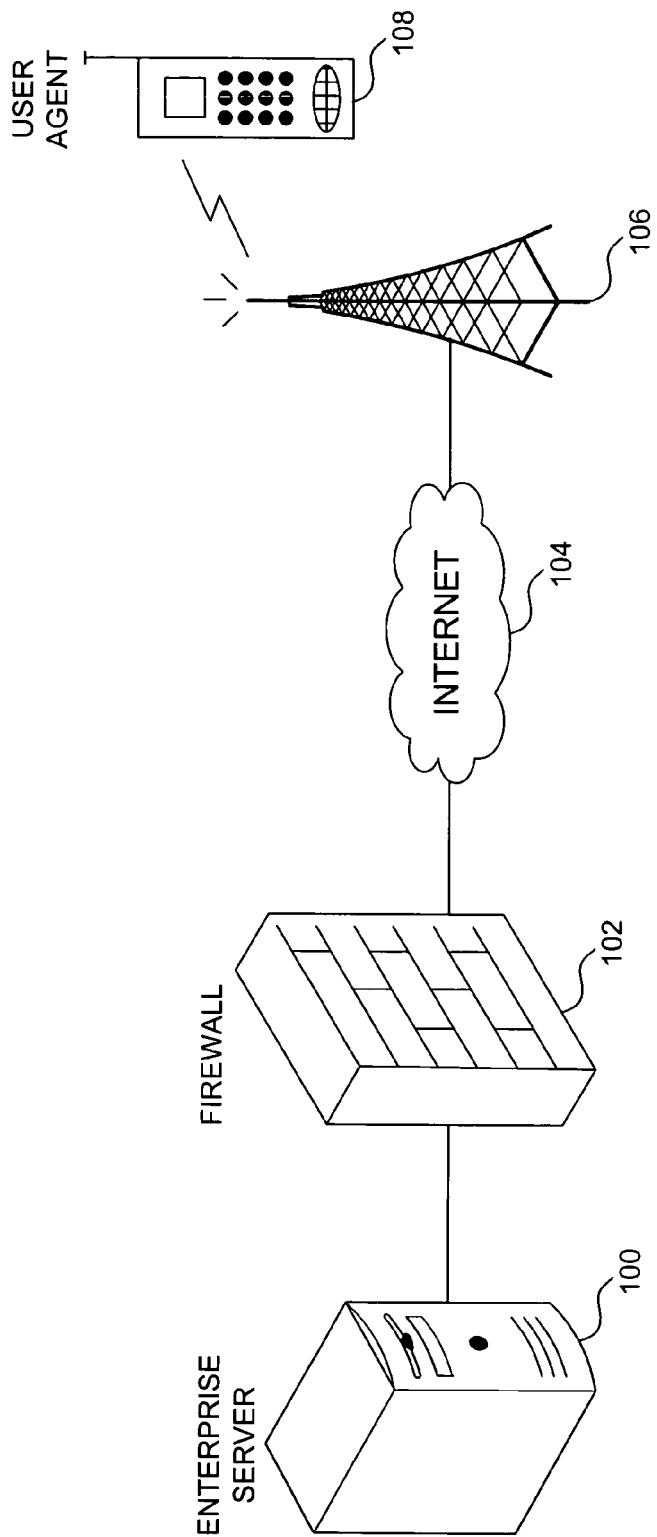
FIG. 1 illustrates the components of a prior art network that facilitates communications between a user agent and an enterprise server.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Relay Server—Overview

Figure 2:
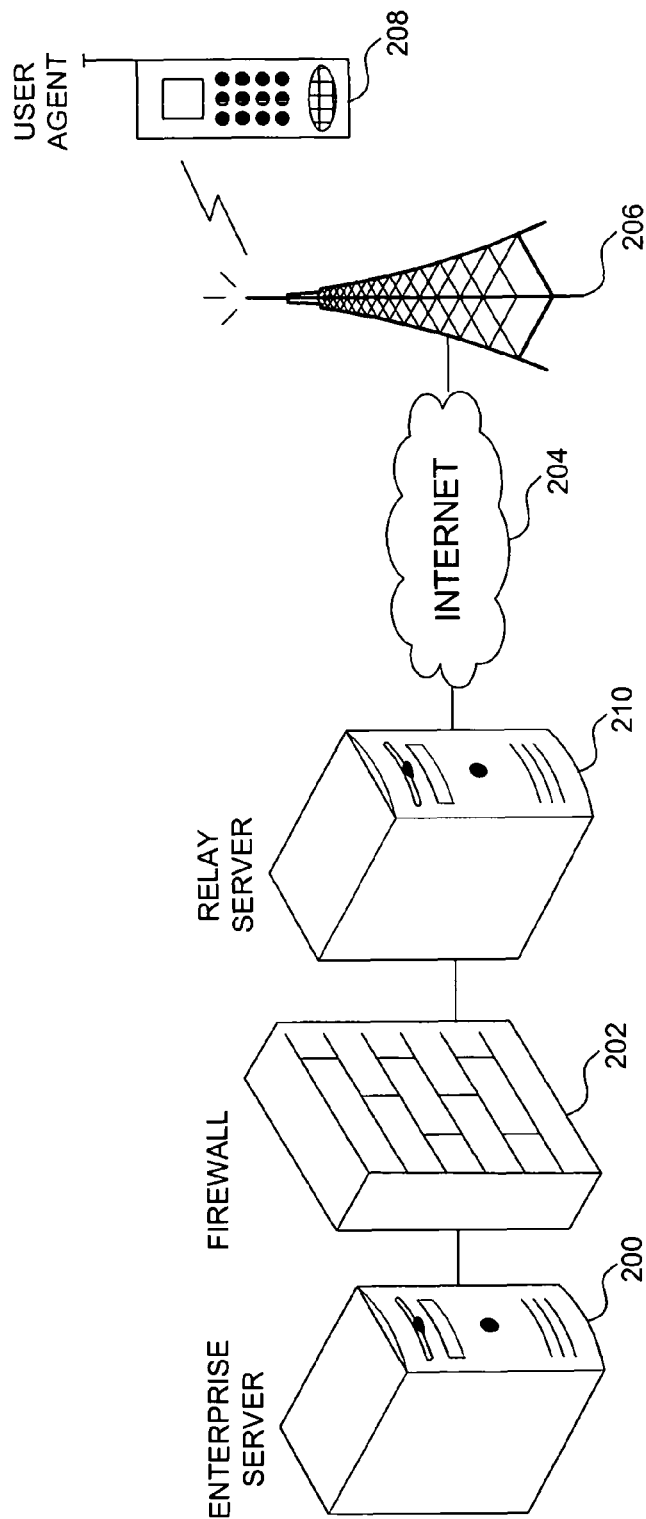
FIG. 2 illustrates the components of a network that facilitates communications between a user agent and an enterprise server in accordance with an embodiment of the present invention.

FIG. 2 illustrates an exemplary network that facilitates communications with a secured enterprise environment. As shown in FIG. 2, the network includes an enterprise server 200 that is connected to a relay server 210 through a firewall 202. The relay server is connected to a wireless communication network 206 through the Internet 204. The wireless communication network 206 further provides communications with a client user agent 208. In accordance with an embodiment of the present invention, the user agent 208 is a mobile device offering such as Windows Mobile, Palm, or Nokia, although the invention is not limited to these examples (such examples being provided solely for purposes of illustration, and not limitation). It should be noted that while the invention is described herein using the example of wireless communications over wireless communication network 206, the invention is not limited to this example embodiment. The user agent 208 need not be a wireless device, and nothing in this specification should be construed such as to limit embodiments of the user agent 208 to wireless devices. Also, persons skilled in the relevant arts will further appreciate that the relay server 210 need not be located in close topological or geographical proximity to the enterprise server 200 and/or firewall 202 as shown in FIG. 2, and may be separated by intervening network nodes. Persons skilled in the relevant arts will further appreciate that the term "enterprise" as applied throughout the specification is used in reference to a typical corporate network, but may further include, by way of example, a similarly configured personal network, and should not be interpreted as limited to a corporate network.

In accordance with an embodiment of the present invention, the enterprise server 200 is configured to provide data to client systems within a corporate network (or other type of network organization) and to the user agent 208. This data may include, by way of example, e-mail messages, although the invention is not limited to this example embodiment and can include any type of data or object. The firewall 202 is configured in a manner consistent with ensuring the safety of systems within the corporate network, including the enterprise server 200. Accordingly, it is desired that the firewall 202 be configured in order to open the fewest number of ports for inbound and outbound communications. In accordance with an embodiment of the present invention, the firewall 202 is configured to deny all incoming connections and allow a single outbound connection from the enterprise server 200 to the relay server 210. One skilled in the relevant arts will appreciate that other unrelated services located behind the firewall 202 may necessitate the opening of additional ports within the firewall 202 for proper interaction with clients other than the user agent 208.

In accordance with another embodiment of the present invention, the relay server 210 is configured to listen for communication requests from the enterprise server 200 as well as from the user agent 208. The relay server 210 is not required to initiate any communications itself.

Figure 3:
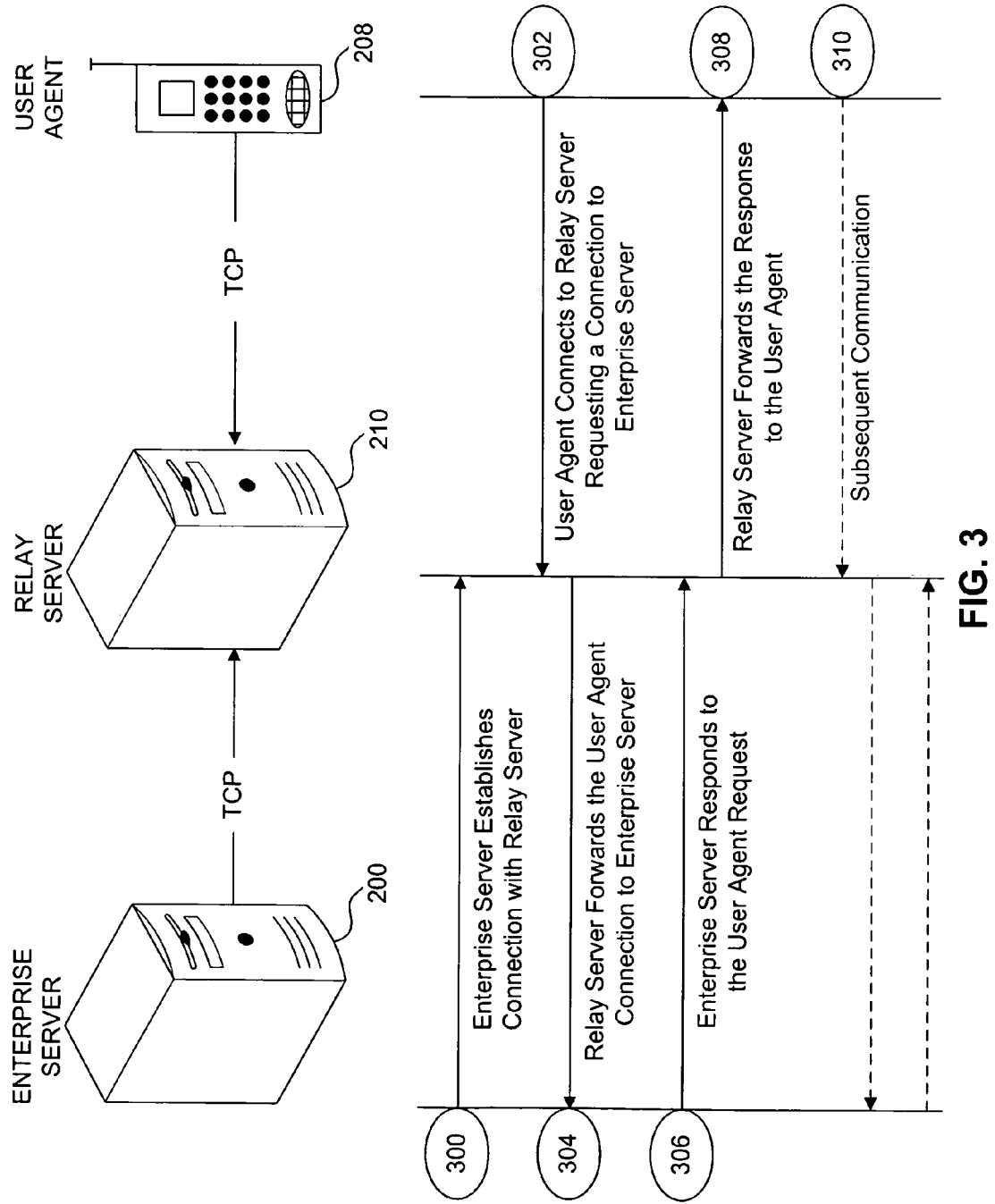
FIG. 3 illustrates a sequence diagram of the steps to establish communications between an enterprise server and a user agent through a relay server in accordance with an embodiment of the present invention.

FIG. 3 illustrates the process by which communications between the user agent 208 and the enterprise server 200 are established through the relay server 210 in accordance with an embodiment of the present invention. At step 300, the enterprise server 200 initiates a connection to the relay server 210 through an open communications port in the firewall 202. Step 300 is performed at the initialization of the enterprise server 200, and the established connection remains permanently active in accordance with an embodiment of the present invention. In accordance with another embodiment of the present invention, step 300 is performed whenever more connections are needed, and the established connection may be closed after it is used. One skilled in the relevant arts will appreciate that there may be additional relevant ways of establishing a connection in accordance with step 300. At step 302, the user agent 208 initiates a connection to the relay server 210, requesting a connection with the enterprise server 200. At step 304, the relay server 210 notifies the enterprise server 200 that the user agent 208 has established a connection to the relay server 210, and further provides the enterprise server 200 with any requests issued by the user agent 208 in its initial communication with the relay server 210.

At step 306, the enterprise server 200 replies to the communication request issued by the user agent 208 by sending a reply to the relay server 210. The relay server 210 forwards this reply to the user agent 208 at step 308. As will be described in more detail herein (see Section II), the relay server 210 at this point has established a communication link between the user agent 208 and the enterprise server 200. At step 310 and beyond, the user agent 208 and enterprise server 200 continue communications with each other by means of this established connection.

While FIGS. 2 & 3 only show a single user agent 208, it is possible for many user agents such as user agent 208 to simultaneously connect to the enterprise server 200 in a similar manner as user agent 208. As will be described in more detail herein, the relay server 210 maintains information on each established connection between itself and a user agent such as user agent 208 as well as between itself and the enterprise server 200. As will also be described in more detail herein, it is further possible for multiple enterprise servers such as enterprise server 200 to establish connections to the relay server 210, and the relay server 210 maintains distinguishing information regarding each established connections.

II. Relay Server Design

In accordance with an embodiment of the present invention, the relay server 210 manages connections from one or more user agents 208 and one or more enterprise servers 200 by maintaining identifying information and other information for the established connections, such maintained information shown as 410 in FIG. 4a. In accordance with an embodiment of the present invention, this identifying information includes a map 413 of server identifiers 412 to free channel lists 414. Each enterprise server 200 connected to the relay server 210 has a unique server identifier 412. Furthermore, each connected enterprise server 200 is associated 413 with a free channel list 414. The free channel list 414 identifies channels (each channel being an established connection session between an enterprise server 200 and the relay server 210) associated with a particular enterprise server 200. The relay server 210 additionally maintains a mapping 417 of an enterprise server session number 416 to a server identifier 418, where the enterprise server session number 416 is a unique identifier used to reference the connection established with the particular enterprise server 200 referred to by the server identifier 418. Whereas the mapping 413 is a one-to-many relationship from a particular enterprise server 200 to free channels 414, the mapping 417 is a one-to-one mapping from the enterprise server session number 416 to the particular enterprise server 200 connected via the established connection. Similarly, the relay server 210 maintains a mapping 421 of a user agent session number 420 to a server identifier 422, where the user agent session number 420 is a unique identifier used to reference the connection established by the particular user agent 208 connected to the particular enterprise server 200 identified by the server identifier 422. It should be noted that the server identifier is shown as elements 412, 418, and 422 in FIG. 4a because there may be more than one server identifier (corresponding to different enterprise servers) known to the relay server 210. One skilled in the relevant arts will notice that there may be additional ways to associate the several connections to each other, and the above referenced mappings should not be construed as the only manner by which a particular user agent 208 may be operable to communicate with a particular enterprise server 200. Accordingly, the above examples are provided solely for purposes of illustration, and not limitation.

The relay server 210 is further capable of maintaining status information 424 for each connected enterprise server 200. The information may include, for example, the enterprise server's GUID 426 when running on a Microsoft Windows platform, or the enterprise server's IP address. One skilled in the relevant arts will appreciate that similar unique identifying information may be recorded on any operating system platform, and implementation of the relay server 210 is not bound to any particular operating system. Furthermore, one skilled in the relevant arts will recognize that the status information 424 may comprise additional information 428 known by the relay server 210 that further describes the enterprise server 200.

Additionally, each enterprise server 200 maintains information about its connections with the relay server 210, in accordance with an embodiment of the present invention, such information shown as 400 in FIG. 4b. For each relay server 210 represented by a relay identifier 402, the enterprise server 200 maintains a mapping 403 of the number of free channels 404 from the enterprise server 200 available for use by the relay server 210, for ensuring that sufficient free channels are provided at all times by the enterprise server 200 to the relay server 210. Furthermore, the enterprise server 200 retains another mapping 405 for each relay identifier 402 about the current state 406 of the relay server 210 as it is known to the enterprise server 200. In accordance with an embodiment of the present invention, the enterprise server 200 implements states known as "waiting", "initialized", "reset", and "OK" to denote the current state 406 of the relay server 210. The states are summarized below:

Waiting—the enterprise server 200 has not received a first ping response from the relay server 210.

Initialized—the enterprise server 200 has received at least one ping response from the relay server 210, and the relay server 210 is awaiting a first set or an additional set of free channels.

Reset—the enterprise server 200 has determined that the relay server 210 believes the enterprise server 200 has been restarted due to a GUID (or equivalent) mismatch.

OK—the relay server 210 is up and running.

The process for establishing a connection between an enterprise server 200 and a user agent 208 through the use of a relay server 210 shall now be described with continued reference to FIGS. 2, 3, 4a, and 4b. At step 300, the enterprise server 200 establishes a connection to the relay server 210 as identified by relay identifier 402, and adds the established connection to the relay server's associated 403 free channel count 404. In accordance with an embodiment of the present invention, the connecting step 300 is only performed if the relay server 210 identified by relay identifier 402 has an associated 405 relay state 406, as shown above, that permits the enterprise server 200 to provide an additional connection.

At step 302, the user agent 208 establishes a connection to the relay server 210. This established connection is identified by the relay server 210 with a user agent session number 420. When the relay server 210 receives data from the user agent 208 connected with the user agent session number 420, the relay server 210 checks the mapping 421 to determine if there is an associated enterprise server 200 identified by server identifier 422. If there is an associated 421 server identifier 422, communications proceed with step 304. Otherwise, if there is no associated 421 server identifier 422, the relay server 210 selects an enterprise server 200 to service the user agent 208 as further described in Section IV. The elected enterprise server 200 is associated with a service identifier 412 which in turn is associated 413 with a list of free channels 414. The relay server 210 then selects one of the free channels (an enterprise server session number 416) from the list of free channels 414 over which to provide communications with the user agent 208 for the enterprise server 200. The enterprise server 200 identified by server identifier 418, as associated 417 with the enterprise server session number 416 used for the created connection, is subsequently associated 421 with the user agent session number 420 as the server identification 422 with which the user agent 208 will communicate.

Continuing at step 304, the relay server 210 forwards communications from the user agent 208 received over a particular user agent session number 420 to the associated 421 enterprise server 200 identified by the server identifier 422. As previously described, the enterprise server 200 provides a response to the relay server 210 at step 306, which then forwards the reply to the user agent 208 at step 308, with subsequent communications following at step 310. At no point is the relay server 210 required to store the actual data communicated between user agent 208 and the enterprise server 200, merely relaying the information.

In accordance with an embodiment of the present invention, the relay server 210 is deployed as a stand-alone system running software to perform relaying services. In accordance with another embodiment of the present invention, relaying services at the relay server 210 are provided as part of a plug-in to a stand-alone web server, such as Apache or Microsoft's IIS. Other implementations of relay server 210 will be apparent to persons skilled in the relevant arts.

In accordance with another embodiment of the present invention, each enterprise server 200 has a set of public and private keys associated with it. When the enterprise server 200 establishes a connection to the relay server 210, it transmits its public key, which is stored at the relay server 210. When the user agent 208 establishes a connection to the relay server 210, the relay server 210 sends a copy of the enterprise server's 200 public key to the user agent 208. Further communication by the user agent 208 can be encrypted using the public key and decoded by the enterprise server 200 using its associated private key.

III. Multi-Tenancy of Relay Servers

Figure 5:
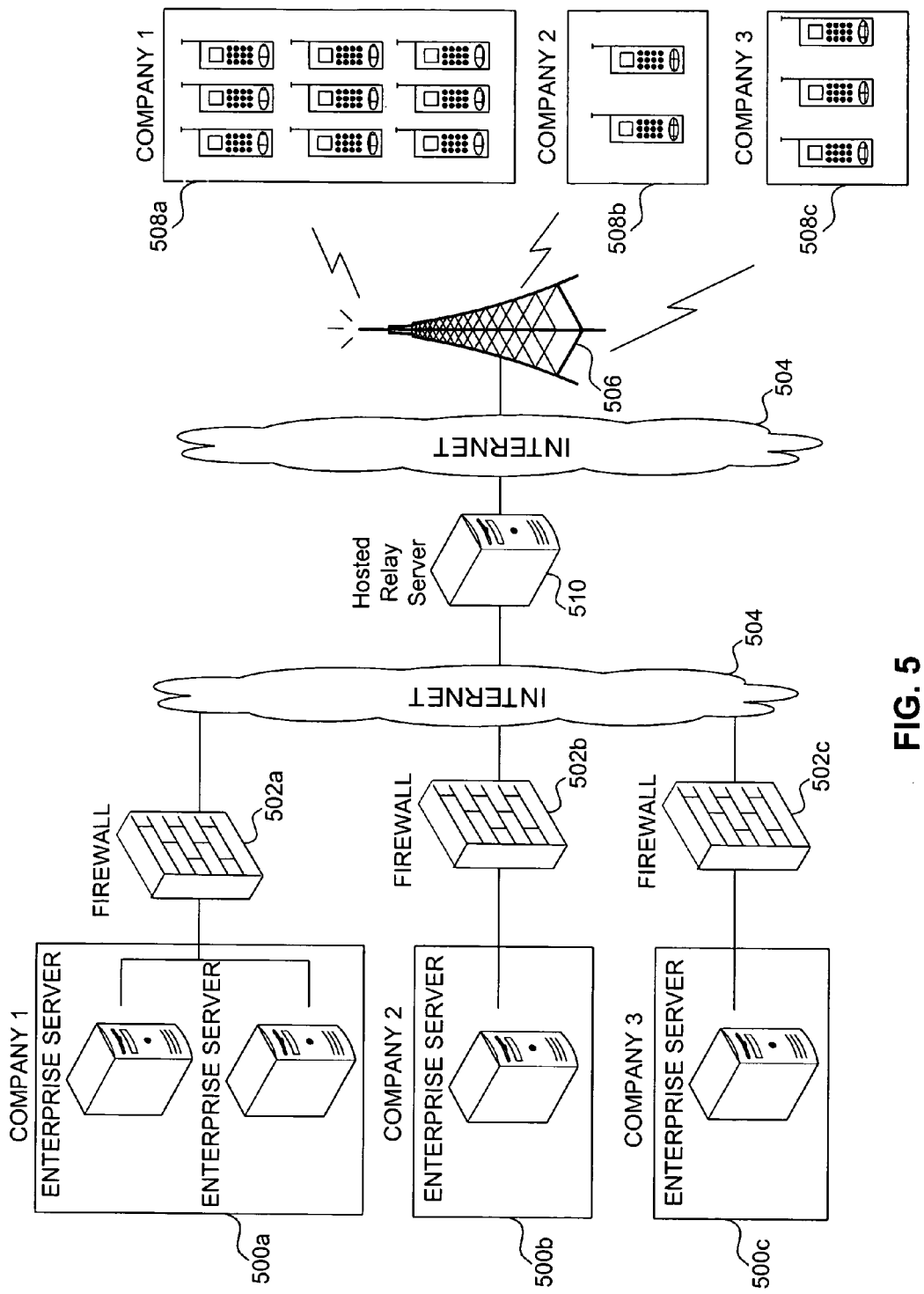
FIG. 5 illustrates the components of a network that facilitates communications between one or more user agents, each user agent belonging to one of one or more companies, and one or more enterprise servers, each enterprise server belonging to one of the one or more companies, in accordance with an embodiment of the present invention.

FIG. 5 illustrates a situation in which a hosted relay server 510 is configured to process communications between enterprise servers belonging to one or more companies 500a-500c and user agents belonging to one or more companies 508a-508c in what is termed a multi-tenant environment. The enterprise servers from each company 500a-500c establish a connection to the hosted relay server 510 through the respective company's firewall 502a-502c. As previously noted, the connection to the hosted relay server 510 may include intervening network nodes, such as the Internet 504. In an embodiment, user agents from each company 508a-508c connect through a wireless communication network 506 to the Internet 504 in order to establish communications with the hosted relay server 510 as before.

The hosted relay server 510 is labeled as "hosted" due to the common usage of servers in a multi-tenant environment. A "hosted" facility is usually one in which a third party owns the facility (in this case, the hosted relay server 510), often for the use of one or more customers, such as the multiple companies shown in FIG. 5. One skilled in the relevant arts will recognize that the hosted relay server 510 need not be owned by a third party, and the one or more companies shown in FIG. 5 may actually be part of the same single company. It is possible, in accordance with an embodiment of the present invention, to use the multi-tenancy facilities of the relay server 510 to partition the use of enterprise servers 500a-500c between the user agents 508a-508c where all of the enterprise servers 500a-500c and user agents 508a-508c are commonly owned and operated. Such partitioning may be used within a single company in order to, for example, control the information available to certain sets of user agents 508a-508c, though a person skilled in the relevant arts will recognize other uses for the multi-tenant environment.

In an implementation such as the one illustrated in FIG. 5, it is desired that the user agents associated with a particular company 508a-508c only establish communications with enterprise servers associated with the same company 500a-500c. For example, a user agent from Company 1 508a should only be allowed to establish communications with an enterprise server from Company 1 500a. This is resolved by identifying each company with a unique Company ID string.

In accordance with an embodiment of the present invention, the user agents 508a-508c and enterprise servers 500a-500c are configured by default to use Company ID "0" for all communications (or some other mutually agreed upon identifier). This configuration allows operation in the degenerate case of a single company without the need to configure user agents 508a-508c and enterprise servers 500a-500c to operate with a specific company. In accordance with another embodiment of the present invention, in order to support a multi-tenant environment, user agents 508a-508c are assigned a Company ID that uniquely identifies enterprise servers 500a-500c associated with their respective companies.

In reference to the communication sequence shown in FIG. 3, and using Company 2 from FIG. 5 as an example, the enterprise server 500b establishes a connection with the hosted relay server 510 at step 300. When establishing the connection, the enterprise server 500b transmits to the relay server 510 its unique Company ID. Similarly, a user agent 508b connects to the hosted relay server 510 at step 302 and notifies the hosted relay server 510 of its Company ID. In step 304, the relay server 510 will then establish a connection between the user agent 408b and an enterprise server from the same company, i.e., enterprise server 400b.

As configuration of support for multiple companies is optional, the Company ID field has no meaning in the case of a single company. Therefore, in accordance with an embodiment of the present invention, it is possible for the enterprise server 500a-500c to not include a Company ID in its communications with the relay server 510. Similarly, it is not necessary for the user agent 508a-508c to include a Company ID in its communications with the relay server 510. In the event that a Company ID is not included in communications, the relay server 510 assumes a Company ID of "0" (or some other mutually agreed upon common string) for that particular communication. In the degenerate case of a single company, an enterprise server 500a-500c in its default configuration state will receive all communications directed to Company ID "0".

In an embodiment, when an enterprise server such as enterprise server 500a first establishes a connection to the relay server 510 as in step 300, it transmits to the relay server 510 public key information for that particular enterprise server 500a, as discussed above. In a multi-tenant environment, in an embodiment, the public key sent by enterprise server 500a is associated with the enterprise server's 500a respective company, rather than with the server itself. Therefore, in accordance with this embodiment, all of the enterprise servers 500a within a particular company must share the same set of public keys.

IV. Load-Balancing of Enterprise Servers

Figure 6:
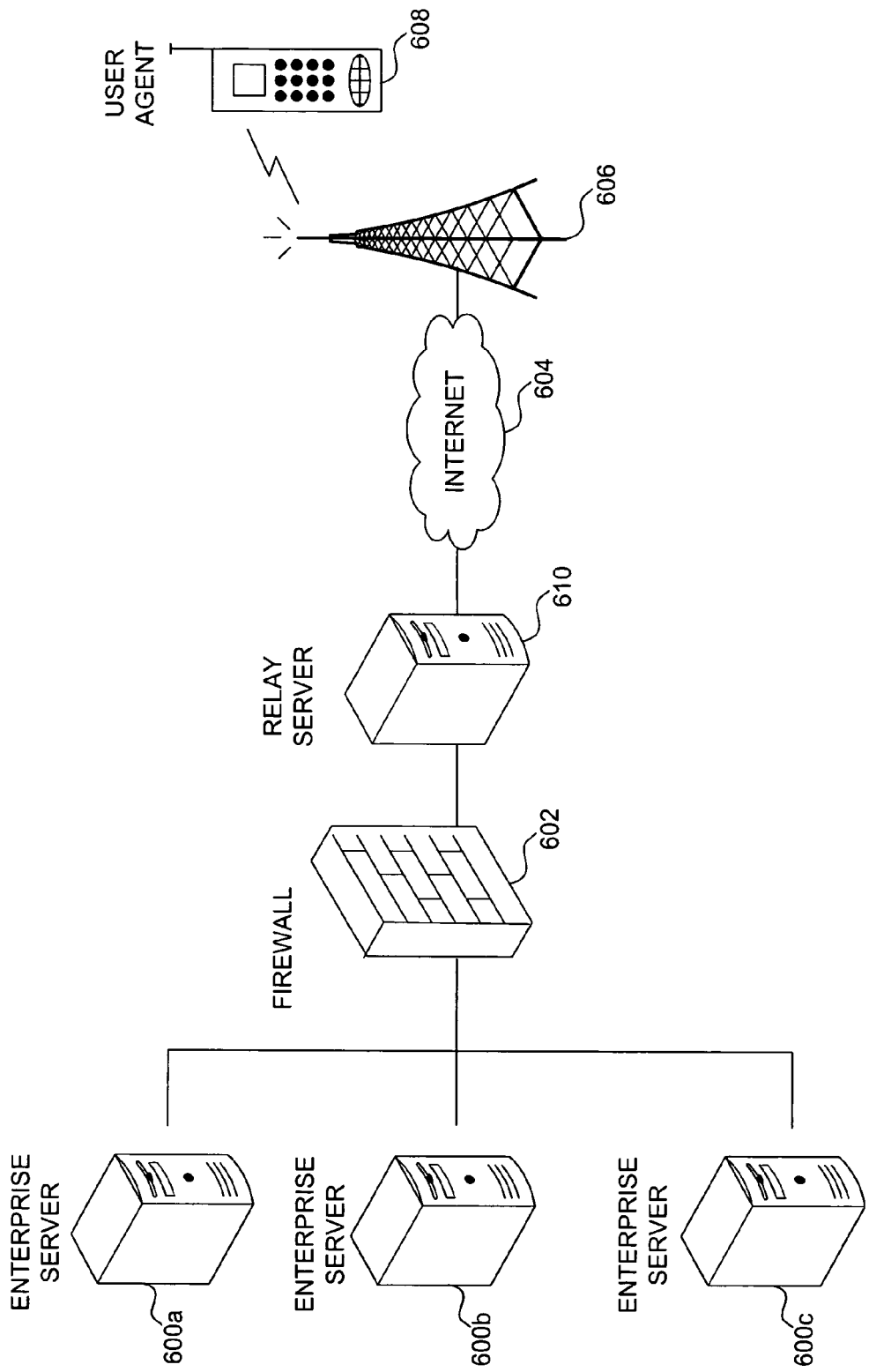
FIG. 6 illustrates the components of a network that facilitates communications between a user agent and a plurality of enterprise servers wherein a relay server distributes a load among each of the plurality of enterprise servers, in accordance with an embodiment of the present invention.

Turning now to FIG. 6, as previously noted it is possible to connect multiple enterprise servers 600a-600c to a single relay server 610, even in a non-multi-tenant environment. The multiple enterprise servers 600a-600c may be multiple enterprise servers within a single company (as identified by a common Company ID, above) or may be the only enterprise servers in the network altogether (as identified by the default Company ID). As before, each enterprise server 600a-600c establishes a connection to the relay server 610 through a firewall 602. One skilled in the relevant arts will recognize that it is not necessary that all of the enterprise servers 600a-600c be behind a common firewall, or behind a firewall at all. Also, in FIG. 6, enterprise servers 600a-600c are simply shown as part of the same local network for purposes of illustration, and should not be interpreted as a limitation.

Again as before, in the illustrative embodiment, a user agent 608 establishes a connection to the relay server 610 through a wireless communication network 606 and the Internet 604. The user agent 608 is associated with a set of one or more enterprise servers 600a-600c depending on its Company ID, if available in a multi-tenant environment.

With continued reference to FIGS. 3-5, whenever an enterprise server 600a-600c establishes a connection to the relay server 610 as in step 300, the enterprise server 600a-600c provides a set of free channels for communication. As previously noted, the relay server 610 keeps a list of the free channels 414 associated 413 with each enterprise server 600a-600c, as identified by server identifier 412. When a new connection is established for the user agent 608, the new connection is routed to one of the free channels 414 by selecting a server identifier 412. In an embodiment, such selection of a free channel is made in a round robin manner. One skilled in the relevant arts will appreciate that there are additional ways of distributing a load that could alternately be used. Once a connection is established between the user agent 608 and the associated enterprise server 600a-600c, the relay server maps 421 the communication session 420 between the user agent 608 and the relay server 610 to the associated enterprise server 600a-600c as identified by server identifier 422. All further communication within that session occurs between the user agent 608 and the same enterprise server 600a-600c with which it established the initial connection, as identified by the server identifier 422, in accordance with an embodiment of the present invention.

A benefit of the use of multiple enterprise servers 600a-600c in a load balancing configuration as just described is evident when many user agents such as user agent 608 connect to the enterprise servers 600a-600c. Whereas a single enterprise server, such as enterprise server 600a, may not be able to handle communications with a very large number of user agents such as user agent 608 by itself, the disclosed configuration of enterprise servers 600a-600c allows for the straightforward introduction of additional enterprise servers to the environment to handle additional user agents such as user agent 608.

V. Load Balancing of Relay Servers

Figure 7:
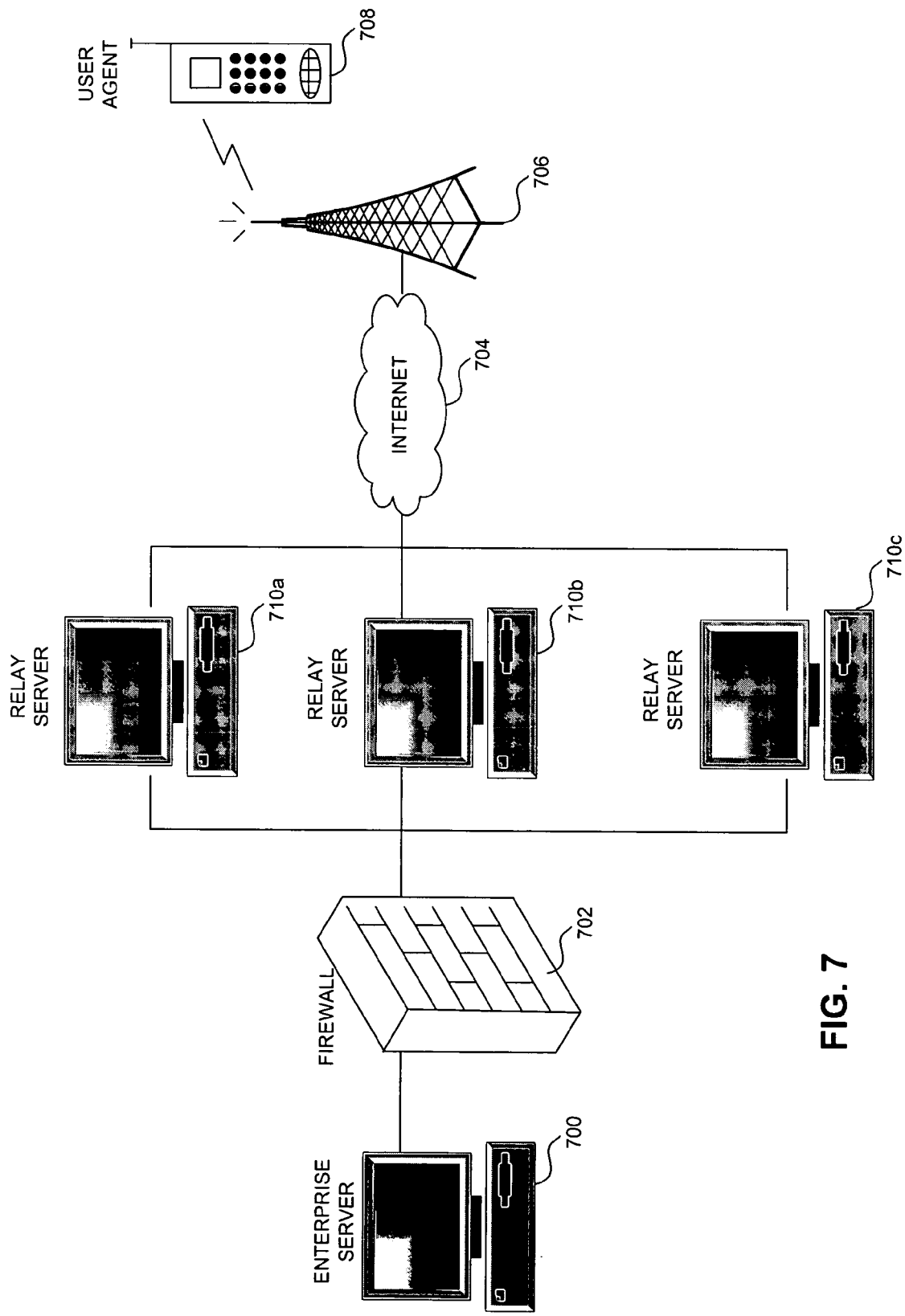
FIG. 7 illustrates the components of a network that facilitates communications between a user agent and an enterprise server wherein a plurality of relay servers process user agent connections in a load-distributing arrangement, in accordance with an embodiment of the present invention.

With reference now to FIG. 7, it is additionally possible to provide multiple relay servers 710a-710c in order to distribute communication loads that would otherwise be handled by a single relay server. As one skilled in the relevant arts will appreciate, the relay servers 710a-710c in a load balancing configuration may be utilized in conjunction with the multi-tenancy and/or enterprise server load balancing configurations disclosed above.

Returning to FIG. 3, at step 300 an enterprise server 700 establishes a connection through firewall 702 to a relay server, such as one of 710a-710c. Assuming by way of example that the enterprise server 700 has established a connection to relay server 710a, in a relay server load balancing configuration, relay server 710a transmits to enterprise server 700 a list of addresses for the additional relay servers 710b-710c. The enterprise server 700 then establishes a connection to each of the additional relay servers 710b-710c.

In accordance with an embodiment of the present invention, enterprise server 700 may establish its initial connection to a relay server, such as relay server 710a, by way of a common address. When a connection is attempted by the enterprise server 700 to the common address, the connection is routed to one of the plurality of relay servers 710a-710c. One skilled in the relevant arts will appreciate that the routing mechanism may select one of the relay servers 710a-710c in several manners, such as, by way of example, a round robin selection.

Similarly, a user agent 708 establishes a connection through a wireless communication 706 and the Internet 704 to one of the relay servers 710a-710c. In accordance with an embodiment of the present invention, in order to load balance relay server communications, the user agent 708 is only connected to a single relay server, such as relay server 710a.

In accordance with another embodiment of the present invention, the user agent 708 does not know the address of the particular relay server, such as relay server 710a, to which it is connected. Instead, in order to facilitate load balancing of the relay server, the user agent 708 attempts to establish a connection to an address that is common to the plurality of relay servers 710a-710c. When the connection is attempted by the user agent 708, the connection is routed to one of the plurality of relay servers 710a-710c. One skilled in the relevant arts will appreciate that the routing mechanism may select one of the relay servers 710a-710c in several manners, such as, by way of example, a round robin selection.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of enabling communication between a first client and a first server through a first firewall, comprising:
    establishing, at a relay server, a first server connection from the first server, wherein the first server connection is initiated by the first server having a first identifier, the first server corresponds to a first tenant, and the first server is behind the first firewall;
    establishing, at the relay server, a first client connection from the first client, wherein the first client connection is initiated by the first client having a second identifier;
    determining that the first identifier and the second identifier match, to denote the first server and the first client as corresponding to the first tenant;
    establishing, at the relay server, a second server connection from a second server, wherein the second server connection is initiated by the second server, the second server corresponds to a second tenant, and the second server is behind a second firewall;
    associating the first server connection with the first client connection based on a match between the first identifier and the second identifier, to partition communications of the first tenant from the second tenant; and
    relaying data between the first client and the first server via the first server connection and the first client connection based on association of the first server connection and the first client connection.

2. The method as set forth in claim 1, wherein establishing the first server connection comprises:
    establishing one or more free channels between the first server and the relay server; and
    maintaining a map, at the relay server, of the free channels to the first server.

3. The method as set forth in claim 2, wherein the first server obtains the current status of the relay server, and
    if the relay server requires more free channels, the first server establishes additional free channels between the first server and the relay server.

4. The method as set forth in claim 2, wherein associating the first server connection with the first client connection comprises:

associating the first client connection with one of the free channels between the first server and the relay server.

5. The method as set forth in claim 4, further comprising:
receiving, at the relay server, a communication request from the first client over the first client connection;
determining, at the relay server, the association between the first client connection and the first server connection; and
forwarding data received in the communication request from the first client over the first client connection to the first server over the first server connection.

6. The method as set forth in claim 1, wherein establishing the first server connection comprises:
assigning a first unique server identifier to the first server connected to the relay server through the first server connection.

7. The method as set forth in claim 6, further comprising:
establishing, at the relay server, a third server connection from a third server, wherein the third server connection is initiated by the third server, the third server corresponding to the first tenant, and the third server is behind the first firewall;
assigning a third unique server identifier to the third server connected to the relay server through the third server connection.
establishing, at the relay server, a second client connection from a second client, wherein the second client connection is initiated by the second client, the second client having a fourth unique server identifier;
associating the second client connection with either the first server connection or the third server connection;
if the second client connection is associated with the first server connection based on a match of the first and fourth unique server identifiers, relaying data between the second client and the first server via the first server connection and the second client connection; and
if the second client connection is associated with the third server connection based on a match of the third and fourth unique server identifiers, relaying data between the second client and the third server via the third server connection and the second client connection.

8. The method as set forth in claim 7, wherein associating the second client connection comprises:
associating the second client connection with either the first server connection or the third server connection in a round robin manner.

9. The method as set forth in claim 1, wherein establishing the first server connection comprises:
associating the first server with a public and private key set.

10. The method as set forth in claim 9, wherein establishing the first server connection comprises:
transmitting the first server's associated public key to the relay server.

11. The method as set forth in claim 10, wherein establishing the first client connection comprises:
transmitting the first server's associated public key from the relay server to the first client.

12. A method of enabling communication between a first client and a first server through a first firewall, comprising:
establishing, a relay server, a first server connection from the first server, wherein the first server connection is initiated by the first server, the first server corresponds to a first tenant, and the first server is behind the first firewall;
receiving from the first server, at the relay server, a first identifier associated with the first server;
establishing, at the relay server, a first client connection from the first client, wherein the first client connection is initiated by the first client;
receiving from the first client, at the relay server, a second identifier associated with the first client;
determining that the first identifier and the second identifier match, to denote the first server and the second client as corresponding to the first tenant;
establishing, at the relay server, a second server connection from a second server, wherein the second server connection is initiated by the second server, the second server corresponds to a second tenant, and the second server is behind a second firewall;
associating the first server connection with the first client connection, to partition communications of the first tenant from the second tenant; and
relaying data between the first client and the first server via the first server connection and the first client connection based on association of the first server connection and the first client connection.

13. The method as set forth in claim 12, further comprising:
establishing, at the relay server, a third server connection from a third server, wherein the third server connection is initiated by the third server;
receiving from the third server, at the relay server, a third identifier associated with the third server;
determining that the third identifier and the second identifier match;
associating the third server connection with the first client connection; and
relaying data between the first client and the third server via the third server connection and the first client connection if the third server connection is associated with the first client connection.

14. A system for secure network communications through a first firewall using a relay server, comprising:
a first client connection between the relay server and a first client, initiated by the first client, the first client having a first identifier;
a first server connection between the relay server and a first server through the first firewall, initiated by the first server, the first server having a second identifier, wherein the first server corresponds to a first tenant, and the first server is behind the first firewall;
a second server connection between the relay server and a second server through a second firewall, initiated by the second server corresponding to a second tenant, wherein the second server is behind the second firewall; and
the relay server configured to:
determine that the first identifier and the second identifier match, to denote the first server and the first client as corresponding to the first tenant, and
relay data from the first server connection to the first client connection and from the first client connection to the server connection, to partition communications of the first tenant from the second tenant.

15. The system as set forth in claim 14, wherein the first server is configured to establish one or more free channels between the first server and the relay server.

16. The system as set forth in claim 15, wherein the relay server is configured to maintain a map of the free channels between the first server and the relay server.

17. The system as set forth in claim 15, wherein the first server is configured to obtain the current status of the relay server.

18. The system as set forth in claim 17, wherein the first server is configured to establish additional free channels between the first server and the relay server if the relay server required more free channels.

19. The system as set forth in claim 15, wherein the relay server associates the first client connection with one of the free channels between the first server and the relay server.

20. The system as set forth in claim 19, wherein the relay server is configured to receive a communication request from the first client over the first client connection, determine the association between the first client connection to the first server connection, and forward data received in the communication request from the first client over the first client connection to the first server over the first server connection.

21. The system as set forth in claim 14, wherein the relay server maintains a unique server identifier for the first server connected to the relay server.

22. The system as set forth in claim 14, wherein the relay server comprises:
a web server; and
a plug-in to the web server for relaying data.

23. The system as set forth in claim 14, wherein the relay server comprises:
a standalone web server capable of relaying data.

24. The system as set forth in claim 14, wherein the first server is associated with a public and private key set.

25. The system as set forth in claim 24, wherein the first server transmits its associated public key to the relay server upon initiation of communications with the relay server by the first server.

26. The system as set forth in claim 25, wherein the relay server transmits the public key associated with the first server to the first client upon initiation of communications with the relay server by the first client.

27. The system as set forth in claim 14 further comprising:
a second client; and
a third server;
wherein the relay server is connected to the second client by a second client connection and further connected to the third server by a third server connection;
wherein the second client connection is initiated by the second client;
wherein the third server connection is initiated by the third server; and
wherein the relay server is configured to determine whether to relay data from the second client connection to the first server connection or to relay data from the second client connection to the third server connection.

28. The system as set forth in claim 27, wherein the determination whether to relay data from the second client connection to the first server connection or to relay data from the second client connection to the third server connection is made in a round robin selection of the first server and the third server.

29. The system as set forth in claim 27, wherein the determination whether to relay data from the second client connection to the first server connection or to relay data from the second client connection to the third server connection is made in a round robin selection of the first server connection and the third server connection.

30. A system for secure network communications through a first firewall, comprising:
a first client, the first client associated with a first identifier;
a first server, the first server associated with a second identifier, wherein the first server corresponds to a first tenant, and the first server is behind the first firewall;
a second server, wherein the second server corresponds to a second tenant, and the second server is behind a second firewall; and
a relay server, the relay server connected to the first client by a first client connection, connected to the first server through the first firewall by a first server connection, and further connected to the second server through the second firewall by a second server connection;
wherein the first client connection is initiated by the first client;
wherein the first server connection is initiated by the first server;
wherein the second server connection is initiated by the second server;
wherein the relay server receives the first identifier and the second identifier;
wherein the relay server is configured to relay data from the first client connection to the first server connection if the first identifier and the second identifier match, to denote the first server and the first client as corresponding to the first tenant; and
wherein the relay server is configured to relay data from the first server connection to the first client connection if the first identifier and the second identifier match, to partition communications of the first tenant from the second tenant.

31. The system as set forth in claim 30, further comprising:
a third server, the third server associated with a third identifier;
wherein the relay server is connected to the third server by a third server connection;
wherein the relay server receives the third identifier;
wherein the relay server is configured to relay data from the first client connection to the third server connection if the first identifier and the third identifier match; and
wherein the relay server is configured to relay data from the third server connection to the first client connection if the first identifier and the third identifier match.

32. A computer-readable storage device having computer-executable instructions stored thereon that, if executed by a computing device, cause the computing device to perform a method comprising:
receiving a communication request from a first server having a first identifier, wherein the first server corresponds to a first tenant, and the first server is behind a first firewall;
receiving a communication request from a first client having a second identifier;
receiving a communication request from a second server, wherein the second server corresponds to a second tenant, and the second server is behind a second firewall;
associating the communication request from the first server to the communication request from the first client if the first identifier and the second identifier match, to denote the first server and the first client as corresponding to the first tenant; and
relaying communications from the first server to the first client and from the first client to the first server if the communication request from the first server is associated to the communication request from the first client, to partition communications of the first tenant from the second tenant.

33. A method comprising:
initiating the establishment of a first client connection to a relay server;
sending a first identifier to the relay server; and receiving data from, and sending data to, a first client via the first client connection and a first server connection associated with the first client connection;

wherein the first client connection is associated with the first server connection by the relay server if the first identifier matches a second identifier provided by the first client when a first server establishes the first server connection with the relay server, to denote the first client connection and the first server connection as corresponding to a first tenant, and wherein associating the first client and first server connections based on matching first and second identifiers partitions communications of the first tenant from a second tenant, the first server corresponds to the first tenant, and the first server is behind a first firewall, a second server corresponds to the second tenant, and the second server is behind a second firewall.

34. A method comprising:

initiating the establishment of a first client connection to a relay server;

sending a second identifier to the relay server; and receiving data from, and sending data to, a first server via the first client connection and a first server connection associated with the first client connection, wherein the first server corresponds to a first tenant, and the first server is behind a first firewall;

wherein the first server connection is associated with the first client connection by the relay server if the second identifier matches a first identifier provided by the first server when the first server establishes the first server connection with the relay server, to denote the first client connection and the first server connection as corresponding to the first tenant, and wherein associating the first client connection and first server connection based on matching first and second identifiers partitions of the first tenant from a second tenant, wherein a second server corresponds to the second tenant, and the second server is behind a second firewall.

* * * * *